(12) United States Patent
Geyer

(10) Patent No.: US 7,994,789 B1
(45) Date of Patent: Aug. 9, 2011

(54) DUAL FIELD SEARCH COIL FOR PULSE INDUCTION METAL DETECTORS

(75) Inventor: Daniel J. Geyer, Sweet Home, OR (US)

(73) Assignee: White's Electronics, Inc., Sweet Home, OR (US)

( * ) Notice: Subject to any disclaimer, the term of this patent is extended or adjusted under 35 U.S.C. 154(b) by 306 days.

(21) Appl. No.: 12/378,123

(22) Filed: Feb. 11, 2009

Related U.S. Application Data

(60) Provisional application No. 61/065,228, filed on Feb. 11, 2008.

(51) Int. Cl.
G01N 27/72 (2006.01)
G01V 3/08 (2006.01)

(52) U.S. Cl. .................................. 324/326; 324/228

(58) Field of Classification Search ............... 324/228, 324/326
See application file for complete search history.

(56) References Cited

U.S. PATENT DOCUMENTS

| | | | |
|---|---|---|---|
| 3,721,859 A * | 3/1973 | Blanyer | 361/236 |
| 4,942,360 A | 7/1990 | Candy | |
| 5,576,624 A | 11/1996 | Candy | |
| 6,104,193 A | 8/2000 | Bell | |
| 6,362,739 B1 | 3/2002 | Burton | |
| 6,690,169 B2 | 2/2004 | Candy | |
| 6,927,577 B2 | 8/2005 | Nelson | |
| 7,075,304 B2 | 7/2006 | Nelson | |
| 7,148,691 B2 | 12/2006 | Nelson et al. | |
| 7,157,913 B2 | 1/2007 | Nelson | |
| 7,176,691 B2 | 2/2007 | Nelson | |

* cited by examiner

*Primary Examiner* — Reena Aurora
(74) *Attorney, Agent, or Firm* — James Creighton Wray

(57) ABSTRACT

A new dual field search coil for pulse induction metal detectors has multiple coplanar wire coils of different diameters connected in series with the output of a pulse source, overcoming the loss of target size resolution associated with a single coil search loop. Small objects are sensed by an internal small coil and larger objects are sensed by the larger outside coil, and the overall depth of target sensing remains similar to that of a single coil construction. The smaller coil is isolated from the pulse source by the inductance of the larger coil and will ring at a frequency determined by its own parameters. To prevent the smaller coil from ringing, a second damping resistor is connected across the terminals of the smaller coil at the junction of the large and small coils making up the modified search loop.

12 Claims, 3 Drawing Sheets

Dual Field Search Coil for Pluse Induction Metal Detectors

35 Outside Large Coil $L_1$

33 Inside Small Coil $L_2$

Wiring Diagram
2 Coil Assembly

DUAL FIELD SEARCH COIL FOR PULSE INDUCTION METAL DETECTORS

This application claims the benefit of U.S. Provisional Application No. 61/065,228, filed Feb. 11, 2008, which is hereby incorporated by reference in its entirety.

FIELD OF THE INVENTION

This invention applies to metal detectors and search coils for metal detectors.

SUMMARY OF THE INVENTION

Briefly the invention is an improved search coil circuit for a hand-held pulse induction metal detector. Target object resolution sensitivity of a search coil is determined by the physical size of the coil. A small diameter coil is best for detecting small objects at short distances. Larger diameter coils are better for detecting large objects at longer distances.

To overcome the loss of target size sensitivity associated with a single search coil, multiple co-planar wire coils of different diameters can be connected in series with the output of the pulse source. Small objects are sensed by an internal small coil and larger objects are sensed by a larger outer coil. The overall range of target sensing remains similar to that of a single coil system.

A problem arises with the signal excitation of the loop. The coil making up the search loop has a composite of electrical parameters related to the resistance of the wire, the inductance, and self-capacitance. An external damping resistor is used to provide critical damping. With multiple coils connected in series with the pulse source, the smaller coil tends to be isolated from the pulse source by the inductance of the larger coil. A second resistor connected across the terminals at the junction point of the large and small coils prevents the small coil from ringing at a frequency determined by its individual parameters.

The improved search coil using multiple wire coils with properly adjusted damping resistors provides much greater flexibility in the detection of widely different target sizes without a significant loss in target detection range.

Pulse induction metal detectors use a search coil connected to a pulse generator. The pulse generator transmits short bursts of electrical current through the search loop. The standard search coil consists of a simple wire coil with multiple turns.

The current bursts flowing through the coil from the pulse generator produces a pulsing electro-magnetic field. This pulsing field induces circulating currents in any conductive metal object within the field. The circulating currents in the metallic target objects in turn create varying magnetic fields around the target object.

As the transmitted electro-magnetic field is turned on and off, the induced magnetic field in a target object extends the time the transmitted electro-magnetic field requires to decay to zero. This increase changes the slope of the decay time of the field. The change in the slope of the decay time is proportional to the size and distance of the metallic target to the coil loop. The change in slope is detected and converted to a D.C. voltage that controls an audio indicating circuit.

The target object resolution of a search coil is determined by the physical size of the coil. The depth that a target object can be sensed is directly proportional to the physical size of the wire coil. However, the physical size of the detected target is inversely proportional to the physical size of the wire coil. As the dimensions of the wire coil increases, the resolution for small targets decreases.

A small diameter search loop can detect small target objects at short distances. A large diameter search loop can detect large target objects at large distances.

Needs exist for improved search coils that can detect a wide variety of target sizes independent of operating distance.

This invention is an improved search coil apparatus for metal detectors using the pulse induction principle to sense buried metal objects. The new dual field search coil for pulse induction metal detectors has multiple coplanar wire coils of different diameters connected in series with the output of a pulse source, overcoming the loss of target size resolution associated with a single coil search loop. Small objects are sensed by an internal small coil and larger objects are sensed by the larger outside coil, and the overall depth of target sensing remains similar to that of a single coil construction.

The smaller coil is isolated from the pulse source by the inductance of the larger coil and will ring at a frequency determined by its own parameters. To prevent ringing, two damping resistors are connected to the search loops, a first damping resistor connected across both loops, based on the parameters of the total coil assembly, and a second damping resistor connected across the terminals of the smaller coil at the junction point of the large and small coils making up the modified search loop. The value of the second resistor is adjusted based on the parameters of the smaller coil to eliminate any ringing in the smaller coil. The second resistor is connected directly across the second coil.

DETAILED DESCRIPTION OF THE INVENTION

To overcome the loss of target size resolution with a single coil search loop, multiple co-planar wire coils of different diameters can be connected in series with the output of the pulse source. Small objects are sensed by an internal small coil and larger objects are sensed by the larger outside coil, and the overall depth of target sensing remains similar to that of a single coil construction.

Figure 1:
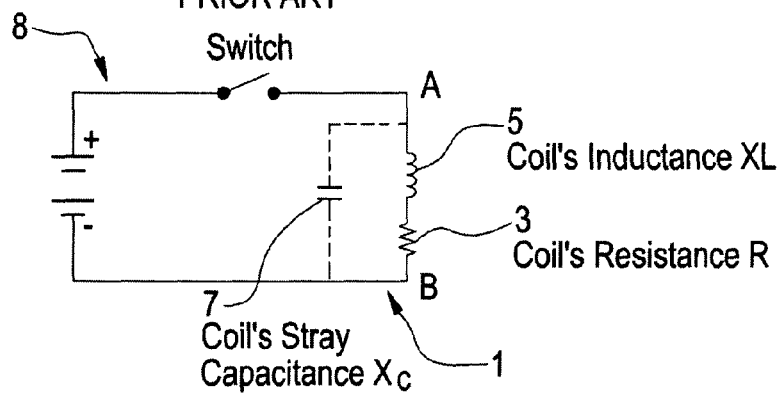
FIG. 1 is a diagram illustrating schematic representation of electrical parameters of a prior art search loop and associated voltage response.

In the several figures, like reference numerals refer to like parts having like functions. One major difficulty to overcome is the result of the signal excitation of the loop. A schematic representation of composite of electrical parameters in a search coil in an example of a search loop is illustrated in the diagram of FIG. 1. The coil of wire 1 making up the search loop has a composite of electrical parameters consisting of the resistance of the wire 3, the inductance 5, and the self-capacitance 7.

Figure 2:
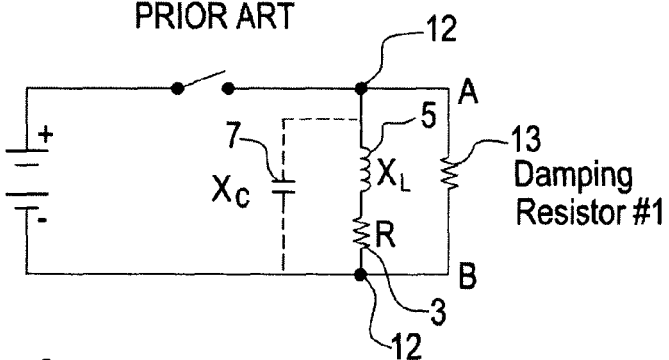
FIG. 2 is a diagram illustrating a prior art search loop with an external damping resistor providing critical damping and an associated voltage response.

When a search coil using a single coil of wire 1 is driven from a switching current source 8 it will tend to ring 9 at a frequency determined by the composite electrical parameters 3, 5, 7 after major driving signal amplitude changes 11. FIG. 2 is a diagram illustrating how an external damping resistor 13 is normally connected across the terminals 12 of the coil to provide critical damping. The damping resistor 13 eliminates the ringing frequency 9 and allows the signal current in the loop to correctly follow the driving signal 15. The value of the resistor for critical damping 13 can be calculated with the formula:

$$R_d = \sqrt{\frac{L}{\pi C}}, \text{ where:}$$

Rd = Critical Damping Resistor value (*Ohms*)

L = Coil Inductance (Henries)

$\pi$ = 3.1415

C = Capacitance (Farads)

Figure 3:
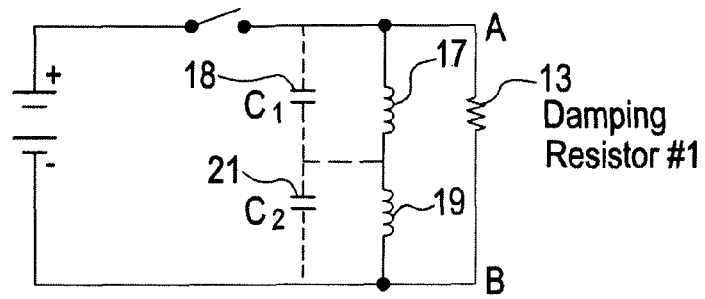
FIG. 3 is a diagram illustrating multiple coils connected in series with the pulse source and an associated voltage response.
Figure 3:
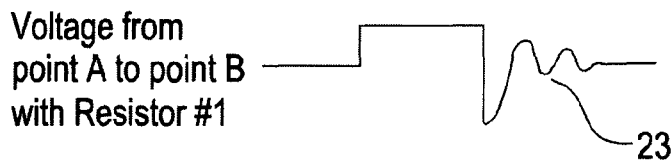

However, with multiple coils connected in series with the pulse source as illustrated in FIG. 3, the smaller coil is isolated from the pulse source by the inductance 17 of the larger coil, which has self-capacitance 18. The self-resonance of the smaller coil will be established by its own inductance 19 and its self-capacitance 21. The smaller coil will ring 23 at a frequency determined by its own parameters.

The second damping resistor is calculated with the given equation using the measured electrical parameters of the second coil. The calculated resistor value will ensure that there is no ringing.

Figure 4:
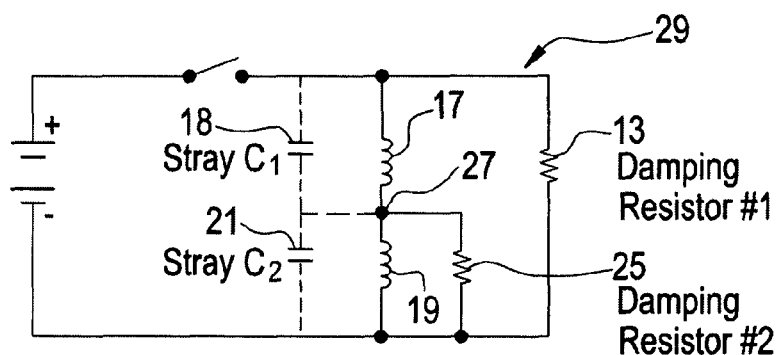
FIG. 4 is a diagram illustrating a multiple coil search loop with a second damping resistor and an associated voltage response.
Figure 4:
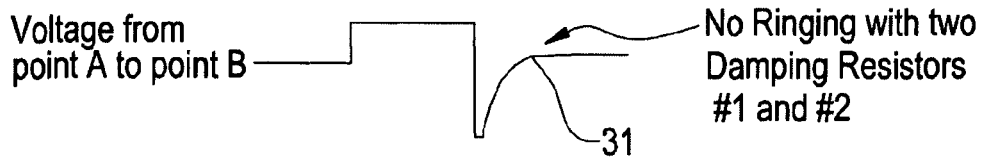

To prevent the smaller coil from ringing and be critically damped a second resistor 25 is connected across the terminals of the smaller coil at the junction point 27 of the large and small coils making up the modified search loop 29 as shown in FIG. 4. The smaller coil is isolated from the electrical driving source by the inductance 17 of the larger coil. The value of damping resistor 25 is thus calculated with the above formula based only on the electrical parameters of the smaller coil. The value of the resistor 25 connected across the terminals of the smaller coil 19 is adjusted to the calculated value to eliminate the ringing signal 23, resulting in a no-ringing response 31. The total inductance of the double coil is equal to the summation of inductances of the two coils 17, 19. With multiple coils, the electrical parameters for the total coil assembly are used for calculating the value of critical damping resistor 13.

Figure 5:
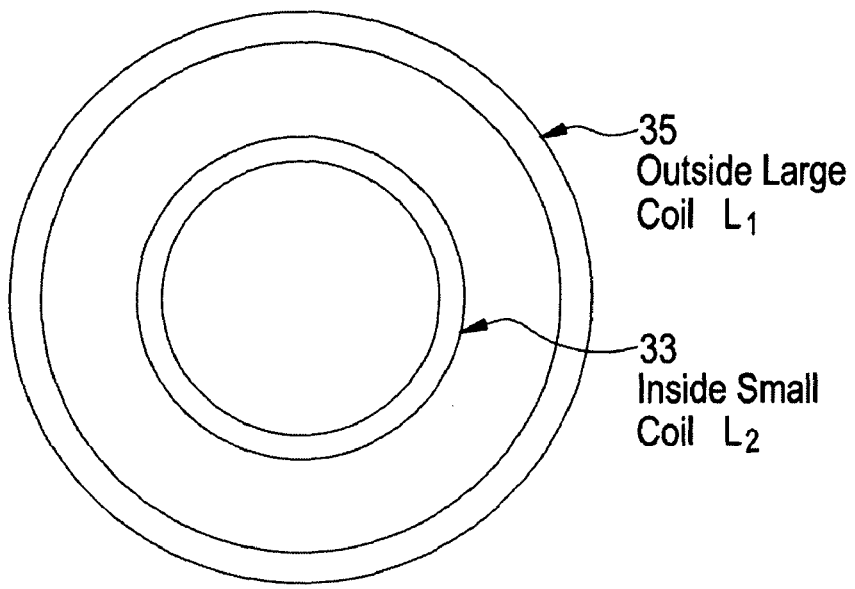
FIG. 5 shows the placement of the physical coils in a two-coil assembly.
Figure 6:
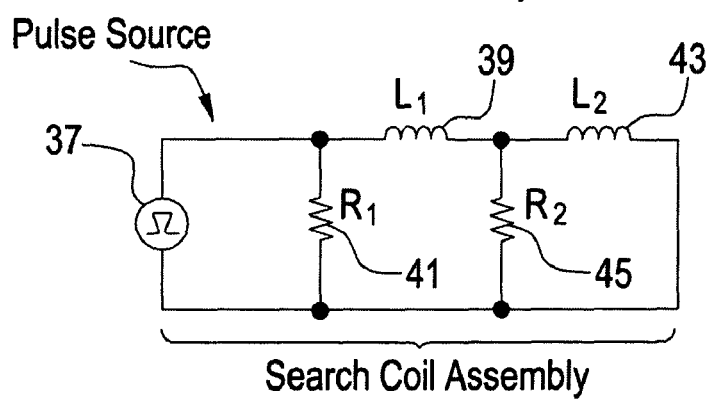
FIG. 6 is a wiring diagram of a two-coil assembly.

FIG. 5 illustrates the placement of the physical coils, with small coil 33 inside the circumference of large coil 35 and isolated from the electrical driving source by the inductance of the large coil 35. FIG. 6 is the associated wiring diagram for the two-coil assembly with pulse source 37 and large coil inductance 39 and resistor 41 and small coil inductance 43 and resistor 45. The coils are connected in series. The value of critical damping resistor 41 is determined by the electrical parameters for the total coil assembly, whereas the value of damping resistor 45 is calculated from the electrical parameters of isolated smaller coil 33.

The double coil assembly is an improved variation of the single coil concept. The total inductance of the double coil is equal to the summation of inductances of the two coils L1 and L2 shown in FIG. 6. The electrical parameters for the total coil assembly are used for calculating the value of critical damping resistor 41 in FIG. 6.

The second coil L2, in Figure, is isolated from the electrical driving source by the inductance of L1 in FIG. 6. Therefore, the damping resistor 45 in FIG. 6 is calculated from the electrical parameters of the second coil L2, shown in FIG. 6.

This improved search coil design using multiple wire coils with associated damping resistors of the proper value provides much greater flexibility in detection of widely different target sizes without a significant loss in detection depth.

When more than two coils are connected in series one critical damping resistor is connected in parallel to the first, second and third series connected coils, one critical damping resistor is connected in parallel to the second and third coils, and one critical damping resistor is connected in parallel to the third coil.

While the invention has been described with reference to specific embodiments, modifications and variations of the invention may be constructed without departing from the scope of the invention, which is defined in the following claims.

I claim:

1. A metal detector apparatus comprising a current source, a switch connected to the current source, first and second search coils including a relatively larger diameter search coil and a relatively smaller diameter search coil connected in series to the current source and the switch, each of the search coils having effective composite electrical parameters of inductance, resistance and self-capacitance, a first critical damping resistor connected in series to the current source and switch and in parallel to the first and second search coils, and a second critical damping resistor connected from a junction between the first and second search coils to the current source or switch.

2. The apparatus of claim 1, wherein the first and second search coils are coplanar.

3. The apparatus of claim 1, wherein resistance of first critical damping resistor is determined by the formula $$R_d = \sqrt{\frac{L}{\pi C}}, \text{ where:}$$

Rd = Critical Damping Resistor value (*Ohms*)

L = Coil Inductance (Henries)

$\pi$ = 3.1415

C = Capacitance (Farads)

and wherein L=coil inductance of the first and second search coils and C=capacitance of the first and second search coils.

4. The apparatus of claim 3, wherein resistance of the second critical damping resistor is determined by the formula $$R_d = \sqrt{\frac{L}{\pi C}}, \text{ where:}$$

Rd = Critical Damping Resistor value (*Ohms*)

L = Coil Inductance (Henries)

$\pi$ = 3.1415

C = Capacitance (Farads)

and wherein L=coil inductance of the second search coil and C=capacitance the second search coil.

5. A metal detector apparatus, comprising a current pulse source, multiple series connected search coils having varied diameters connected in series with the current pulse source, a critical damping resistor connected in parallel with the series connected search coils, and at least one additional critical damping resistor connected in parallel to at least one search coil in the series connected search coils.

6. The apparatus of claim 5, wherein the first and second search coils are coplanar.

7. A metal detector apparatus, comprising a current pulse source, multiple series connected search coils having varied diameters connected in series with the current pulse source, a critical damping resistor connected in parallel with the series connected search coils, and at least one additional critical damping resistor connected in parallel to at least one search coil in the series connected search coils, wherein resistance of the first critical damping resistor is determined by the formula $$R_d = \sqrt{\frac{L}{\pi C}}, \text{ where:}$$

Rd = Critical Damping Resistor value (*Ohms*)
L = Coil Inductance (Henries)
$\pi$ = 3.1415
C = Capacitance (Farads)

and wherein L=coil inductance of the first and second search coils and C=capacitance of the first and second search coils.

8. The apparatus of claim 7, wherein resistance of the additional critical damping resistor is determined by the formula $$R_d = \sqrt{\frac{L}{\pi C}}, \text{ where:}$$

Rd = Critical Damping Resistor value (*Ohms*)
L = Coil Inductance (Henries)
$\pi$ = 3.1415
C = Capacitance (Farads)

and wherein L=coil inductance of the second search coils and C=capacitance of second search coils.

9. Metal detector apparatus comprising a current pulse source, multiple series connected search coils connected in series to each other and connected in series to the current pulse source, multiple critical damping resistors, at least one of the critical damping resistors connected in parallel to the series connected search coils, at least one other of the multiple critical damping resistors connected in parallel to one of the search coils.

10. The apparatus of claim 9, wherein the first and second search coils are coplanar.

11. Metal detector apparatus comprising a current pulse source, multiple series connected search coils connected in series to each other and connected in series to the current pulse source, multiple critical damping resistors, at least one of the critical damping resistors connected in parallel to the series connected search coils, at least one other of the multiple critical damping resistors connected in parallel to one of the search coils, wherein resistance of first critical damping resistor is determined by the formula $$R_d = \sqrt{\frac{L}{\pi C}}, \text{ where:}$$

Rd = Critical Damping Resistor value (*Ohms*)
L = Coil Inductance (Henries)
$\pi$ = 3.1415
C = Capacitance (Farads)

and wherein coil inductance of the first and second search coils and C=capacitance of the first and second search coils.

12. The apparatus of claim 11, wherein resistance of the second critical damping resistor is determined by the formula $$R_d = \sqrt{\frac{L}{\pi C}}, \text{ where:}$$

Rd = Critical Damping Resistor value (*Ohms*)
L = Coil Inductance (Henries)
$\pi$ = 3.1415
C = Capacitance (Farads)

and wherein L=coil inductance of the second search coils and C=capacitance of the second search coils.

* * * * *